United States Patent [19]

Kang

[11] Patent Number: 5,617,253

[45] Date of Patent: Apr. 1, 1997

[54] ZOOM LENS

[75] Inventor: Geon-mo Kang, Kyeongsangnam-do, Rep. of Korea

[73] Assignee: Samsung Aerospace Industries, LTD., Kyeongsangnam-do, Rep. of Korea

[21] Appl. No.: 338,757

[22] Filed: Nov. 10, 1994

[30] Foreign Application Priority Data

Nov. 11, 1993 [KR] Rep. of Korea .............. 93-23912

[51] Int. Cl.⁶ .................................................. G02B 15/14
[52] U.S. Cl. .................. 359/692; 359/690; 359/687; 359/688
[58] Field of Search ........................ 359/690, 692, 359/687, 688

[56] References Cited

U.S. PATENT DOCUMENTS

| | | | |
|---|---|---|---|
| 4,838,669 | 6/1989 | Ogata et al. | 359/692 |
| 5,109,299 | 4/1992 | Kato | 359/692 |
| 5,398,135 | 3/1995 | Ohashi | 359/692 |

FOREIGN PATENT DOCUMENTS

| | | |
|---|---|---|
| 4307416A1 | 9/1993 | Germany . |
| 4343050A1 | 6/1994 | Germany . |
| 1-193808 | 8/1989 | Japan . |
| 1-288823 | 11/1989 | Japan . |
| 3-260610 | 11/1991 | Japan . |

*Primary Examiner*—Georgia Y. Epps
*Assistant Examiner*—Thomas Robbins
*Attorney, Agent, or Firm*—Finnegan, Henderson, Farabow, Garrett & Dunner, L.L.P.

[57] ABSTRACT

A zoom lens system using inexpensive plastic lens materials and having a good aberration performance and good optical performance includes a first lens group having a positive refractive power and a second lens group having a negative refractive power, a distance between the first lens group and the second lens group being variable during zooming, wherein $37<(F_I\cdot f_{bT}/D_T\cdot f_{bW})<48$; and $2.5<D_T/N_{nI}<3.5$ where $f_I$ is focal length of the first lens group, $f_{bT}$ is back focus distance at a telephoto position, $f_{bW}$ is back focus distance at a wide angle position, $D_T$ is distance between the first lens group and the second lens group at a telephoto position, and $N_{nI}$ is refractive ratio of the lens having a negative refractive power in the first lens group.

5 Claims, 4 Drawing Sheets

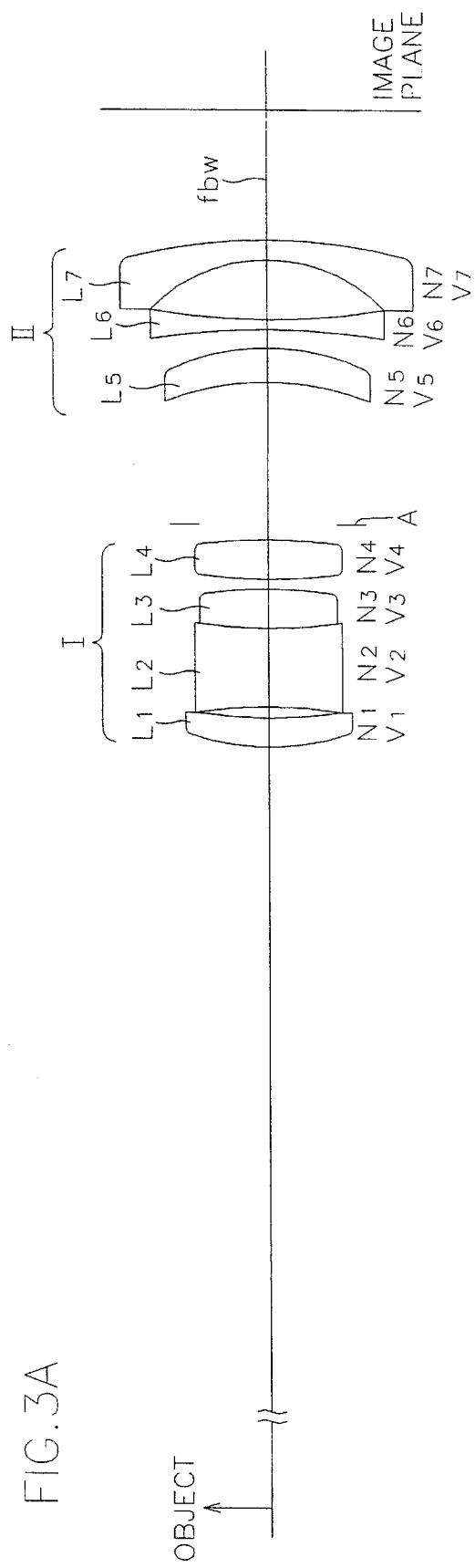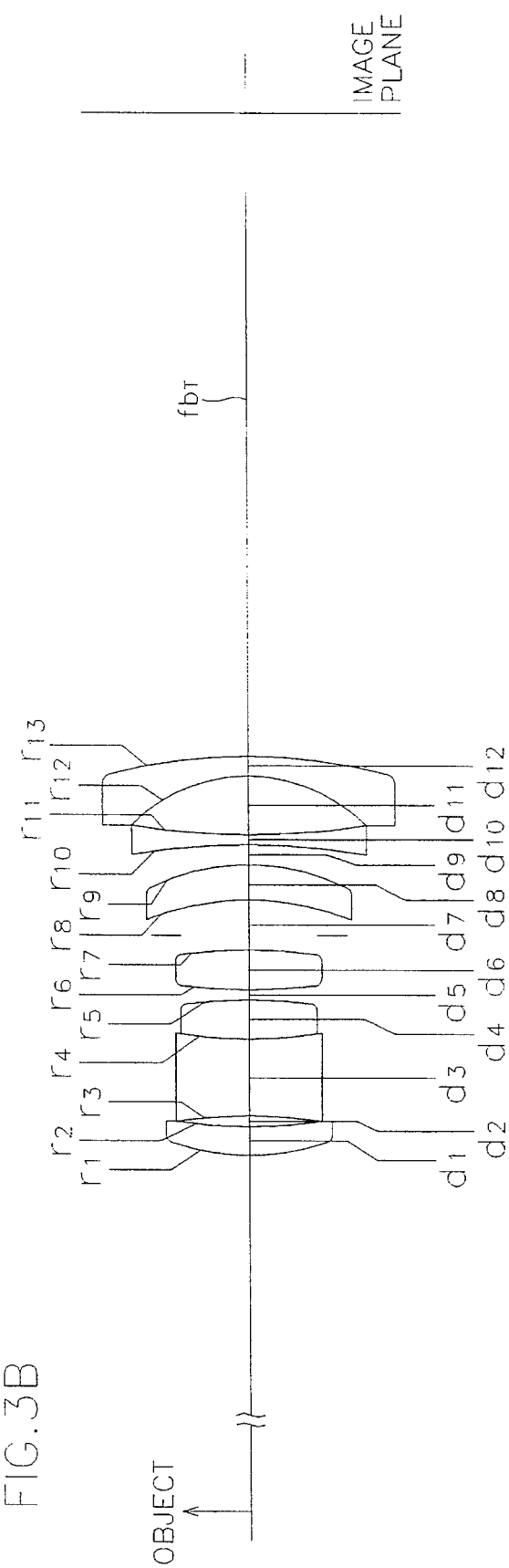
FIG.3A
FIG.3B

ZOOM LENS

BACKGROUND OF THE INVENTION

A. Field of the Invention

The present invention relates to a zoom lens system composed of two lens groups, and, more particularly to a zoom lens system in which inexpensive lens materials can be used, a good aberration performance is maintained, the location of image point does not change even though the atmospheric temperature changes, and a good optical performance is maintained.

B. Description of the Prior Art

Recently, so called "lens shutter" cameras have become compact, have automatic features, and have a zoom lens with a focal length which varies linearly. The lens shutter cameras are required to be compact, light, and inexpensive especially because they are for non-professional users.

Generally, zoom lenses for the lens shutter cameras are divided into a two lens group or a three lens group. The two lens group is preferred for a zoom ratio of about 2 times because a lens barrel for the two lens group can be designed and controlled easily and produced economically.

For example, Japanese Patent laid-open No. 1-193808 (title: zoom lens for compact cameras, published on Aug. 3, 1989), Japanese Patent laid-open No. 1-288823 (title: small-sized zoom lens, published on Nov. 21, 1989) and Japanese Patent laid-open No. 3-260610 (title: small-sized zoom lens, published on Nov. 20, 1991) disclose zoom lenses of the two lens group.

The zoom lens disclosed in Japanese Patent laid-open No. 1-193808 has a zoom ratio below 1.9 times and uses expensive lens materials. It is not economically successful because a plastic lens is used as a first lens and is susceptible to external impact. The zoom lens disclosed in Japanese Patent laid-open No. 1-288823 has many elements and uses aspheric surface lenses made of glass which are expensive. The zoom lens disclosed in Japanese Patent laid-open No. 3-260610 is made of a relatively inexpensive material. However it has a zoom ratio too low to maintain a good optical performance.

SUMMARY OF THE INVENTION

The present invention overcomes the problems and disadvantages of the prior art by providing a zoom lens system in which inexpensive lens materials can be used, good aberration performance is maintained, location of image point does not change even though atmospheric temperature changes, and good optical performance is maintained, and which is capable of mass production in order to reduce the manufacturing cost.

To achieve the objects, the present invention provides a zoom lens system comprising a first lens group having a positive refractive power and the second lens group having a negative refractive power, a distance between the first lens group and the second lens group being variable during zooming, wherein the first lens group includes a first lens having a positive refractive power with a shape of a meniscus lens convex toward an object, a second lens having a negative refractive power with two concave sides, a third lens having a positive refractive power with two convex sides and spaced from or a butting the second lens, and a fourth lens having a positive refractive power with two convex sides and spaced from the third lens. The second lens group includes a fifth lens having a positive refractive power with a shape of a meniscus lens concave toward the object, a sixth lens having a negative refractive power, and a seventh lens having a negative refractive power, wherein $$37 < (f_f \cdot f_{bT}/D_T \cdot f_{bW}) < 48;$$ [condition 1]

and $$2.5 < D_T/N_{nf} < 3.5$$ [condition 2]

where $f_f$: focal length of the first lens group $f_{bT}$: back focus distance at a telephoto position $f_{bW}$: back focus distance at a wide angle position $D_T$: distance between the first lens group and the second lens group at a telephoto position $N_{nf}$: refractive ratio of the lens having a negative refractive power in the first lens group.

Also, the present invention provides a zoom lens system comprising a first lens group having a positive refractive power and a second lens group having a negative refractive power, the distance between the first lens group and the second lens group being variable during zooming. The first lens group includes a first lens having a positive refractive power with a shape of a meniscus lens convex toward an object, a second lens having a negative refractive power with two concave sides, a third lens having a positive refractive power with two convex sides and spaced from or abutting the second lens, and a fourth lens having a positive refractive power with two convex sides and spaced from the third lens. The second lens group includes a fifth lens having a positive refractive power with a shape of a meniscus lens concave toward the object, a sixth lens having a negative refractive power, and a seventh lens having a negative refractive power, wherein $$N_T < 1.65;$$ [condition 3]

and $$v_T$$ [condition 4]

where $N_T$: average of refractive ratio of the lens system as a whole $v_T$: average of ABBE number of the lens system as a whole.

Further, the present invention provides a zoom lens system comprising a first lens group having a positive refractive power and a second lens group having a negative refractive power, a distance between the first lens group and the second lens group being variable during zooming, wherein the first lens group includes a first lens having a positive refractive power with a shape of a meniscus lens convex toward an object, a second lens having a negative refractive power with two concave sides, a third lens having a positive refractive power with two convex sides and spaced from or abutting the second lens, and a fourth lens having a positive refractive power with two convex sides and spaced from the third lens. The second lens group includes a fifth lens having a positive refractive power with a shape of a meniscus lens concave toward the object, a sixth lens having a negative refractive power, and a seventh lens having a negative refractive power, wherein $$N_{nf} < 1.75;$$ [condition 5]

$$n_{apf} < 1.55;$$ [condition 6]

$38 < v_{apI}/N_{apI} 21\ 45;$ [condition 7]

and $20 < v_{nI}/N_{nI} < 30$ [condition 8]

where $N_{apI}$: average of refractive ratios of lenses having positive refractive power in the first lens system $N_{nI}$: refractive ratio of a lens having a negative refractive power in the first lens system $v_{apI}$: average of ABBE numbers of lenses having positive refractive power in the first lens system $v_{nI}$: ABBE number of a lens having a negative refractive power in the first lens system.

Still further, the present invention provides a zoom lens system comprising a first lens group having a positive refractive power and a second lens group having a negative refractive power, a distance between the first lens group and the second lens group being variable during zooming, wherein the first lens group includes a first lens having a positive refractive power with a shape of a meniscus lens convex toward an object, a second lens having a negative refractive power with two concave sides, a third lens having a positive refractive power with two convex sides and spaced from or abutting on the second lens, and a fourth lens having a positive refractive power with two convex sides and spaced from the third lens. The second lens group includes a fifth lens having a positive refractive power with a shape of a meniscus lens concave toward the object, a sixth lens having a negative refractive power, and a seventh lens having a negative refractive power, wherein $N_{pII} < 1.6;$ [condition 9]

$N_{anII} < 1.7$ [condition 10]

and $0.7 < (v_{apI} - v_{nI})/(v_{anII} - v_{pII}) < 1.5$ [condition 11]

where $N_{pII}$: refractive ratio of a lens having a positive refractive power in the second lens system $N_{anII}$: average of refractive ratios of lenses having negative refractive power in the second lens system $v_{anI}$: average of ABBE numbers of lenses having negative refractive power in the second lens system $v_{pII}$: ABBE number of a lens having a positive refractive power in the second lens system.

$v_{apI}$: average of ABBE numbers of lenses having positive refractive power in the first lens system $v_{nI}$: ABBE number of a lens having a negative refractive power in the first lens system.

Also still further, the present invention provides a zoom lens system comprising a first lens group having a positive refractive power and a second lens group having a negative refractive power, a distance between the first lens group and the second lens group being variable during zooming, wherein the first lens group includes a first lens having a positive refractive power with a shape of a meniscus lens convex toward an object, a second lens having a negative refractive power with two concave sides, a third lens having a positive refractive power with two convex sides and spaced from or abutting on the second lens, and a fourth lens having a positive refractive power with two convex sides and spaced from the third lens. The second lens group includes a fifth lens having a positive refractive power with a shape of a meniscus lens concave toward the object, a sixth lens having a negative refractive power, and a seventh lens having a negative refractive power, signs of refractive powers of two adjacent lenses being of natures opposite to each other such that a location of an image point does not change even though an atmospheric temperature changes, and made of a plastic material, wherein $0.08 < |f_{pII}/f_{NII}| < 1.20$ [condition 12]

where $f_{pII}$: focal length of plastic lenses having positive refractive power in the second lens system $f_{NII}$: focal length of plastic lenses having negative refractive power in the second lens system.

Also still further, the present invention provides a zoom lens system comprising a first lens group having a positive refractive power and a second lens group having a negative refractive power, a distance between the first lens group and the second lens group being variable during zooming, wherein the first lens group includes a first lens having a positive refractive power with a shape of a meniscus lens convex toward an object, a second lens having a negative refractive power with two concave sides, a third lens having a positive refractive power with two convex sides and spaced from or abutting on the second lens, and a fourth lens having a positive refractive power with two convex sides and spaced from the third lens, at least two pairs of the lenses being with same radii of curvature; the second lens group includes a fifth lens having a positive refractive power with a shape of a meniscus lens concave toward the object, a sixth lens having a negative refractive power, and a seventh lens having a negative refractive power.

The zoom lens system satisfying the condition 1 can compensate for balance of aberrations throughout the zooming range. However, in a range below the lower limit of the condition 1, the refractive power of the first lens group becomes strong such that variations in aberrations, especially a spherical aberration and a COMA aberration, during zooming become large and a change of the space between the first lens group and the second lens group becomes small to make obtaining a sufficient zoom ratio difficult. On the contrary, in a range higher than the upper limit of condition 1, the refractive power of the first lens group becomes weak such that a back focus distance at a wide angle position becomes short and an effective diameter of the second lens group becomes large and the space between the first lens group and the second lens group at a telephoto position becomes small to make designing the lens operating mechanism difficult.

The condition 2 relates to a negative refractive ratio and a zoom ratio of the first lens group. The space between the first lens group and the second lens group becomes small to make obtaining a sufficient zoom ratio difficult at a range higher than the upper limit, and material cost becomes higher at a range below the lower limit.

The conditions 3 and 4 relate to material of the lens system as a whole, and it is possible to reduce the material cost of the lens system by fulfilling the conditions.

The conditions 5 through 8 relate to the first lens group wherein the conditions 5 and 6 are for compensating for the Petzval's sums generated from the first lens group and it is possible to reduce material costs of the first lens group as a whole by fulfilling each condition. The conditions 7 and 8 are important for compensating for chromatic aberration. It is difficult to compensate for Petzval's sums of an image plane in a range below the lower limit, and to compensate for chromatic aberration in a range higher than the upper limit.

The conditions 9 through 11 relate to the second lens group, wherein ranges for using optical plastic materials and the inexpensive optical glass materials are defined.

No existing plastic material is adequate for a range higher than the upper limit of the condition 9, and if conditions 9 through 11 are fulfilled, the compensation for Petzval's sums of the image plane can be performed properly.

If condition 12 is fulfilled, the location of image point does not change even though the atmospheric temperature changes, thus maintaining good optical performance.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate preferred embodiments of the invention and together with the description, serve to explain the principles of the invention.

BRIEF DESCRIPTION OF THE DRAWINGS

FIGS. 3A and 3B are sectional views of a zoom lens at wide angle and telephoto positions, respectively, according to a second embodiment of the present invention.

DESCRIPTION OF THE PREFERRED EMBODIMENT

Figure 1A:
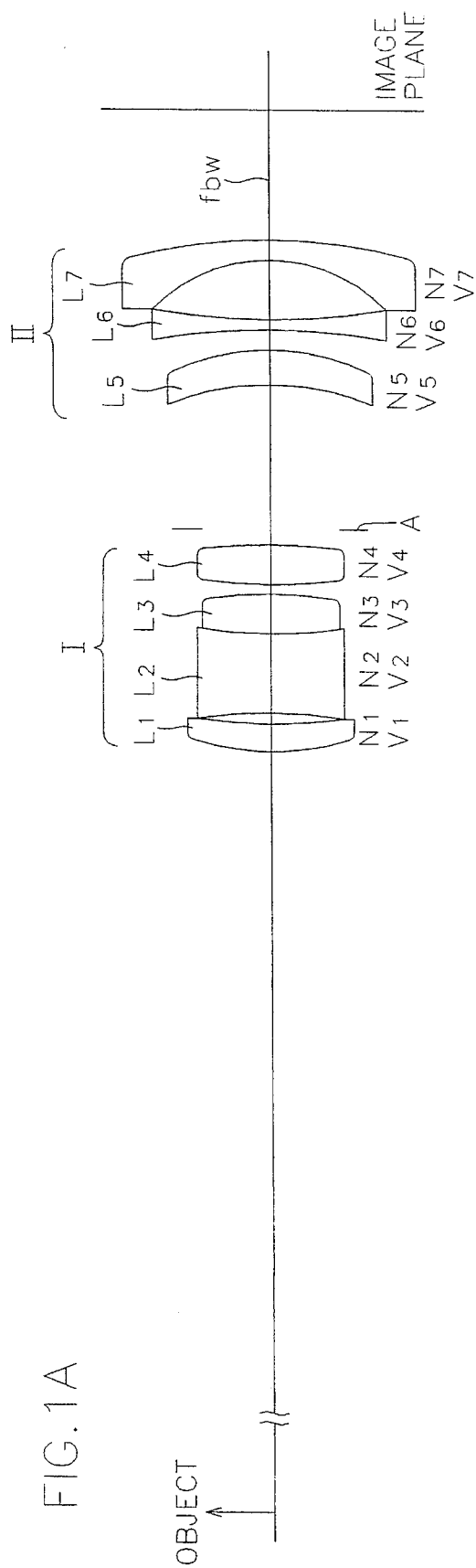
FIGS. 1A and 1B are sectional views of a zoom lens at wide angle and telephoto positions, respectively, according to a first embodiment of the present invention.
Figure 1B:
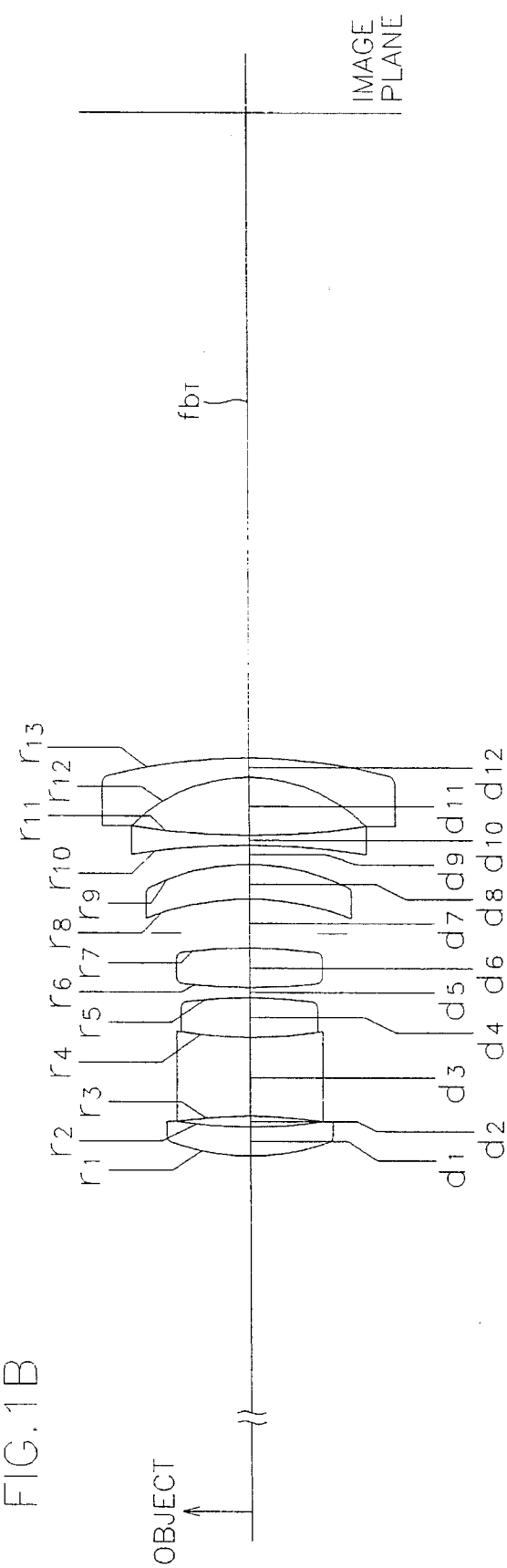

Reference will now be made in detail to the first and second preferred embodiments of the present invention, examples of which are illustrated in the accompanying drawings. Wherever possible, the same reference numbers will be used throughout the drawings to refer to the same or like parts.

The zoom lens system according to the first embodiment of the present invention comprises a first lens group I having a positive refractive power, a second lens group II having a negative refractive power, and an aperture stop "A", a distance between the first lens group I and second lens group II being variable during zooming.

The first lens group I includes a first lens L1 having a positive refractive power with a shape of a meniscus lens convex toward an object, a second lens L2 having a negative refractive power with two concave sides, a third lens L3 having a positive refractive power with two convex sides and spaced from or abutting the second lens L2, and a fourth lens L4 having a positive refractive power with two convex sides and spaced from the third lens L3 in order to make the variation in aberration during zooming small and maintain good optical performance.

The second lens group II is spaced from the first lens group I and includes a fifth lens L5 having a positive refractive power with a shape of a meniscus lens concave toward the object, a sixth lens L6 having a negative refractive power, and a seventh lens L7 having a negative refractive power, wherein $37<(f_f \cdot f_{bT}/D_T \cdot f_{bW})<48;$ [condition 1]

and $2.5<D_T/N_{nI}<3.5$ [condition 2]

where $f_I$: focal length of the first lens group
$f_{bT}$: back focus distance at a telephoto position
$f_{bW}$: back focus distance at a wide angle position
$D_T$: distance between the first lens group and the second lens group at a telephoto position
$N_{nI}$: refractive ratio of the lens having a negative refractive power in the first lens group.

The zoom lens system comprises a first lens group I having a positive refractive power and a second lens group II having a negative refractive power, wherein $N_T<1.65;$ [condition 3]

$v_T$ [condition 4]

where $N_T$: average of refractive ratio of the lens system as a whole $v_T$: average of ABBE number of the lens system as a whole.

Also, the zoom lens system comprises a first lens group I having a positive refractive power and a second lens group II having a negative refractive power, wherein $N_{nI}<1.75;$ [condition 5]

$N_{apI}<1.55;$ [condition 6]

$38<v_{apI}/N_{apI}<45;$ [condition 7]

and $20<v_{nI}/N_{nI}<30$ [condition 8]

where $N_{apI}$: average of refractive ratios of lenses having positive refractive power in the first lens system $N_{nI}$: refractive ratio of a lens having a negative refractive power in the first lens system $v_{apI}$: average of ABBE numbers of lenses having positive refractive power in the first lens system $v_{nI}$: ABBE number of a lens having a negative refractive power in the first lens system.

And, the zoom lens system comprises a first lens group I having a positive refractive power and a second lens group II having a negative refractive power, wherein $N_{pII}<1.6;$ [condition 9]

$N_{anII}<1.7;$ [condition 10]

and $0.7<(v_{apI}-v_{nI})/(v_{anII}-v_{pII})<1.5$ [condition 11]

where $N_{pII}$: refractive ratio of a lens having a positive refractive power in the second lens system $N_{anII}$: average of refractive ratios of lenses having negative refractive power in the second lens system $v_{anII}$: average of ABBE numbers of lenses having negative refractive power in the second lens system $v_{pII}$: ABBE number of a lens having a positive refractive power in the second lens system $v_{apI}$: average of ABBE numbers of lenses having positive refractive power in the first lens system $v_{nI}$: ABBE number of a lens having a negative refractive power in the first lens system.

Also, the zoom lens system comprises a first lens group I having a positive refractive power and a second lens group II having a negative refractive power, the distance between the first lens group I and second lens group II being variable during zooming, wherein the first lens group I includes a first lens L1 having a positive refractive power with a shape of a meniscus lens convex toward an object, a second lens L2 having a negative refractive power with two concave sides, a third lens L3 having a positive refractive power with two convex sides and spaced from or abutting on the second lens L2, and a fourth lens L4 having a positive refractive power with two convex sides and spaced from the third lens L3, the second lens group II includes a fifth lens L5 having a positive refractive power with a shape of a meniscus lens concave toward the object, a sixth lens L6 having a negative refractive power, and a seventh lens L7 having a negative refractive power, signs of refractive powers of two adjacent lenses being of natures opposite to each other such that a location of an image point does not change even though an atmospheric temperature changes, and made of a plastic material, wherein $$0.80 < |f_{pII}/f_{NII}| < 1.20 \qquad \text{[condition 12]}$$

where $f_{pII}$: focal length of plastic lenses having positive refractive power in the second lens system $f_{NII}$: focal length of plastic lenses having negative refractive power in the second lens system.

Also, the zoom lens system comprises a first lens group I having a positive refractive power and a second lens group II having a negative refractive power, the distance between the first lens group I and second lens group II being variable during zooming, wherein the first lens group I includes a first lens L1 having a positive refractive power with a shape of a meniscus lens convex toward an object, a second lens L2 having a negative refractive power with two concave sides, a third lens L3 having a positive refractive power with two convex sides and spaced from or abutted on the second lens L2, and a fourth lens L4 having a positive refractive power with two convex sides and spaced from the third lens L3, at least two pairs of the lenses being with same radii of curvature, the second lens group II includes a fifth lens L5 having a positive refractive power with a shape of a meniscus lens concave toward the object, a sixth lens L6 having a negative refractive power, and a seventh lens L7 having a negative refractive power.

The zoom lens system satisfying the condition 1 can compensate for balance of aberrations throughout the zooming range. However, at a range below the lower limit of the condition 1, the refractive power of the first lens group I becomes strong such that variations in aberrations, especially a spherical aberration and a COMA aberration, during zooming become large and a change of the space between the first lens group I and the second lens group II becomes small to make obtaining a sufficient zoom ratio difficult. On the contrary, at a range higher than the upper limit of the condition 1, the refractive power of the first lens group I becomes weak such that a back focus distance at a wide angle position becomes short and an effective diameter of the second lens group II becomes large and the space between the first lens group I and the second lens group II at a telephoto position becomes small to make designing the lens operating mechanism difficult.

The condition 2 relates to a negative refractive ratio and a zoom ratio of the first lens group I. The space between the first lens group I and the second lens group II becomes small to make obtaining a sufficient zoom ratio difficult at a range higher than the upper limit, and material costs becomes higher at a range below the lower limit.

The conditions 3 and 4 relate to material of the lens system as a whole, and it is possible to reduce the material cost of the lens system by fulfilling the conditions.

The conditions 5 through 8 relate to the first lens group I wherein the conditions 5 and 6 are for compensating for the Petzval's sums generated from the first lens group I and it is possible to reduce material costs of the first lens group I as a whole by fulfilling each condition. The conditions 7 and 8 are important for compensating for chromatic aberration. It is difficult to compensate for Petzval's sums of an image plane at a range below the lower limit, and it is difficult to compensate for the chromatic aberration at a range higher than the upper limit.

The conditions 9 through 11 relate to the second lens group II wherein the ranges for using the optical plastic materials and the inexpensive optical glass materials are defined.

No existing plastic material is adequate for the range higher than the upper limit of condition 9, and if conditions 9 through 11 are fulfilled, the compensation for Petzval's sums of the image plane can be performed properly.

If condition 12 is fulfilled, the location of image point does not change even though the atmospheric temperature changes, thus maintaining good optical performance.

Figure 2A:
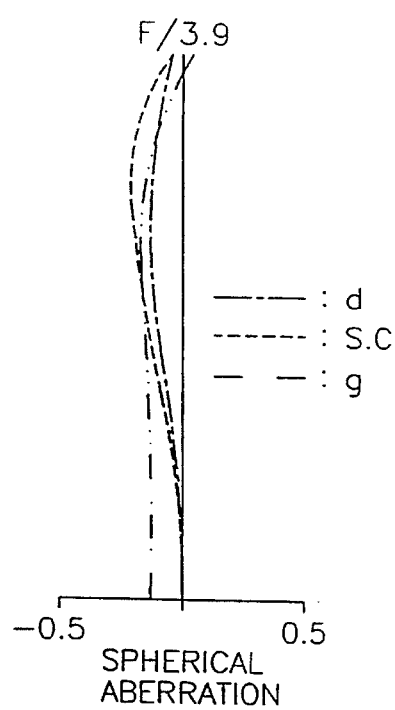
FIGS. 2A–2C and 2D–2F show the extent of various aberrations associated with the zoom lens at wide angle and telephoto positions, respectively, according to the first embodiment of the present invention.
Figure 2B:
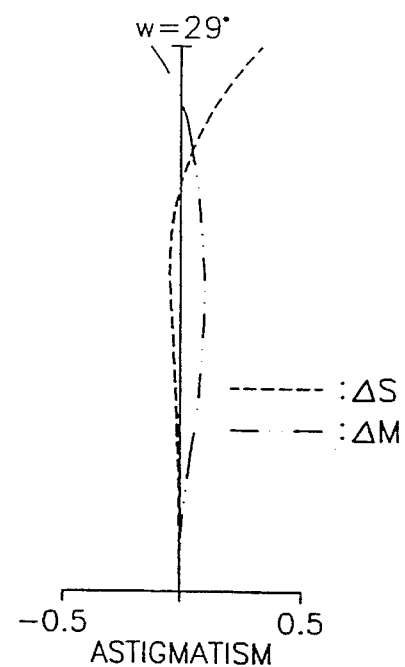
Figure 2C:
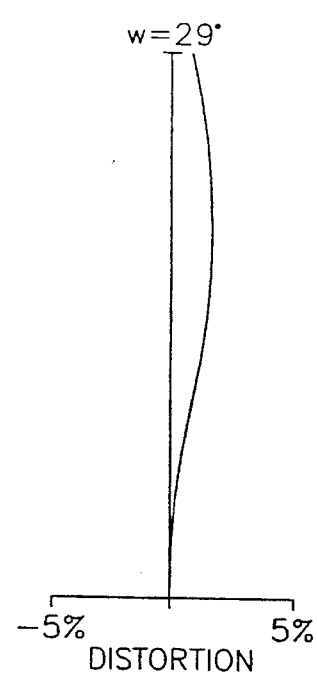
Figure 2D:
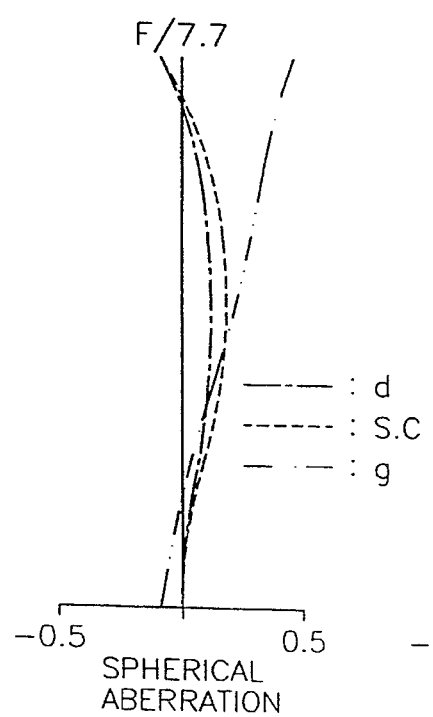
Figure 2E:
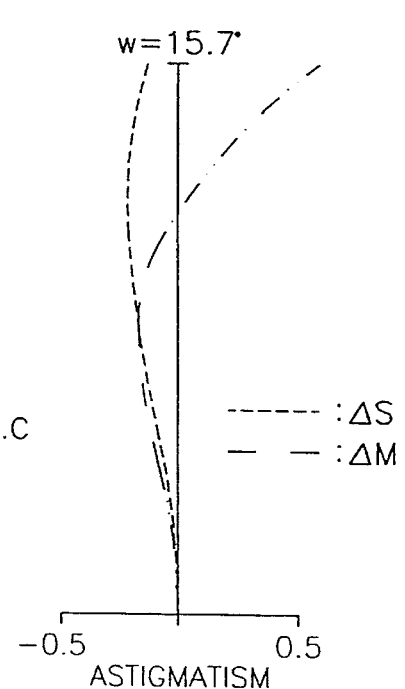
Figure 2F:
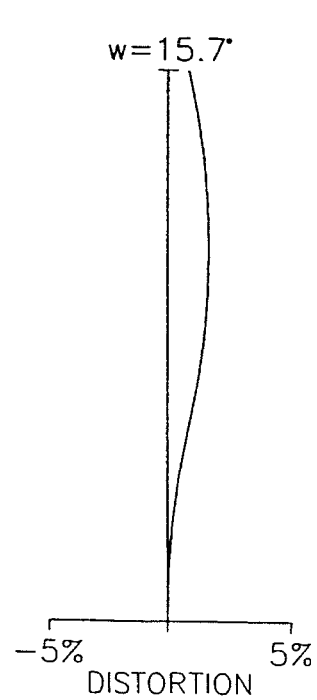

The aberrations can be compensated for as shown in FIGS. 2A–2C and 2D–2F by fulfilling the above conditions such that good optical performance can be maintained and that the optical lenses can be made of inexpensive materials.

A set of exemplary parameter values for the zoom lens system according to the first embodiment is provided in reference to Table 1, where $F_{NO}$ is F number, f is focal length, $f_B$ is back focus distance, $\delta$ is half view angle, d is thickness of lens or space, N is refractive ratio of d-line, and $v_T$ is ABBE number of lens.

Also, an aspheric surface is represented by:

$$X = \frac{Cy^2}{1 + \{1 - (K+1)C^2 y^2\}^{1/2}} + A_4 y^4 + A_6 y^6 + A_8 y^8 + A_{10} y^{10}$$

where

X : distance from an apex of the lens along the optical axis y : vertical distance from the optical axis C : reciprocal number of the radius of curvature at the apex of the lens K : Conic constant
$A_4, A_6, A_8, A_{10}$: aspheric surface coefficients

TABLE 1

$F_{NO} = 1:3.9\text{~}7.7$
$f = 39.1\text{~}77.0$
$\omega = 29.0°\text{~}15.7°$
$f_B = 9.5\text{~}45.0$

| Surface Number | r | d | N | $\upsilon$ |
|---|---|---|---|---|
| 1 | 17.204 | 2.55 | 1.58913 | 61.3 |
| 2 | 40.400 | 1.21 | | |
| 3 | −18.200 | 5.50 | 1.74400 | 44.9 |
| 4 | 16.590 | 3.05 | 1.51680 | 64.2 |
| 5 | −16.590 | 1.16 | | |
| 6 | 29.800 | 2.83 | 1.51680 | 64.2 |
| 7 | −29.800 | 11.628 | 3.000 | |
| 8 | −30.690 | 2.86 | 1.59044 | 30.9 |
| 9 | −14.216 | 1.31 | | |
| 10 | −25.160 | 1.00 | 1.49176 | 57.4 |
| 11 | 102.500 | 4.59 | | |
| 12 | −11.600 | 1.80 | 1.74400 | 44.9 |
| 13 | −31.100 | | | |

Conic constant and aspheric surface coefficients of r9
K: −7.492528796714
$A_4$: −0.1501185854631×10$^{-3}$
$A_6$: 0.9956860394996×10$^{-6}$
$A_8$: −0.511653134843×10$^{-8}$
$A_{10}$: 0

Conic constant and aspheric surface coefficients of r10
K : −30.039627967147
$A_4$: −0.8163472875418×10$^{-5}$
$A_6$: 0.3327562245679×10$^{-6}$
$A_8$: −0.1083694004586×10$^{-8}$
$A_{10}$: 0

The values of the conditions 1 to 12 are as follows:

| | |
|---|---|
| $f_T \cdot f_{bT}/D_T \cdot f_{bW}$: 42.64 | [condition 1] |
| $D_T/N_{nI}$: 1.720 | [condition 2] |
| $N_T$: 1.59899 | [condition 3] |
| $\upsilon_T$: 52.54 | [condition 4] |
| $N_{nI}$: 1.74400 | [condition 5] |
| $N_{apI}$: 1.54091 | [condition 6] |
| $\upsilon_{apI}/N_{apI}$: 41.03 | [condition 7] |
| $\upsilon_{nI}/N_{nI}$: 25.75 | [condition 8] |
| $N_{pII}$: 1.59044 | [condition 9] |
| $N_{aNII}$: 1.61788 | [condition 10] |
| $\upsilon_{apI}-\upsilon_{NI})/(\upsilon_{aNII}-\upsilon_{PII})$:0.905 | [condition 11] |
| $|f_{pII}/f_{NII}|$: 1.028 | [condition 12] |

Figure 4A:
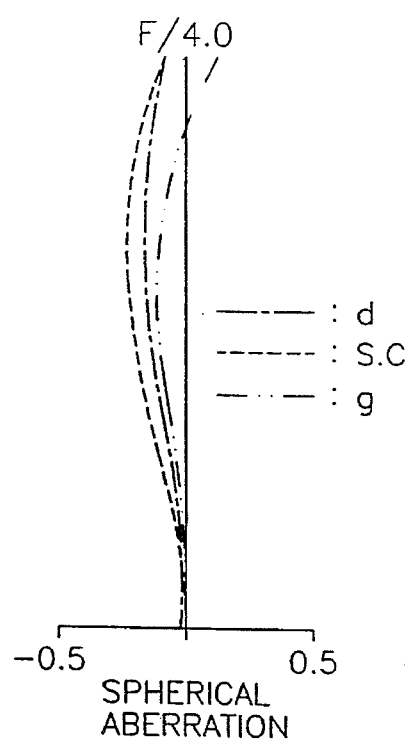
FIGS. 4A–C and 4D–F show the extent of various aberrations associated with the zoom lens at wide angle and telephoto positions, respectively, according to the second embodiment of the present invention.
Figure 4B:
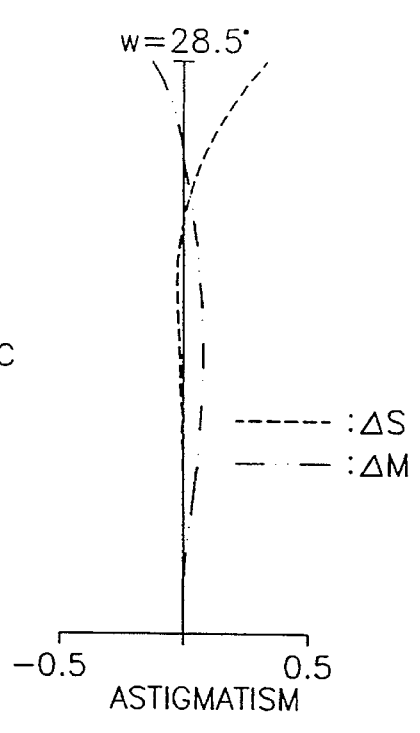
Figure 4C:
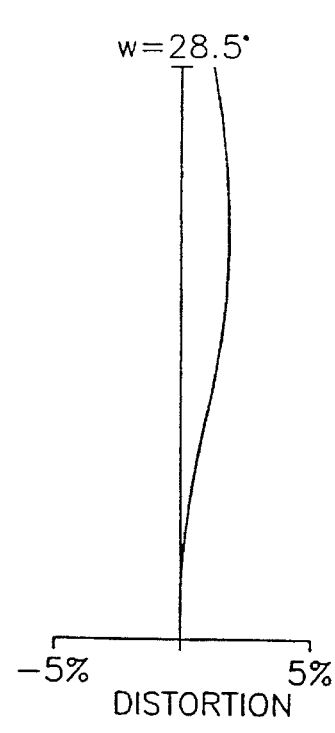
Figure 4D:
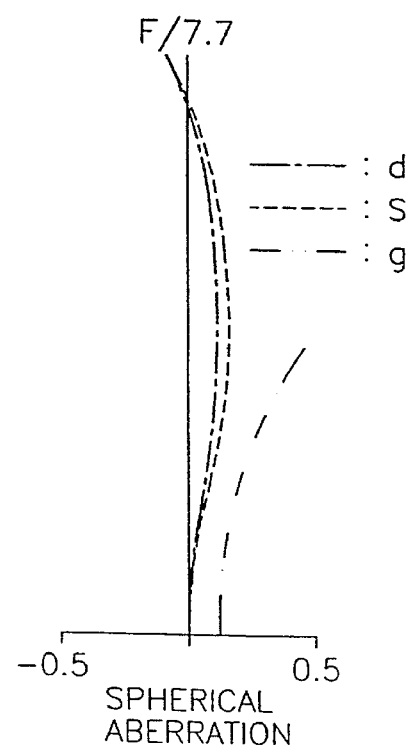
Figure 4E:
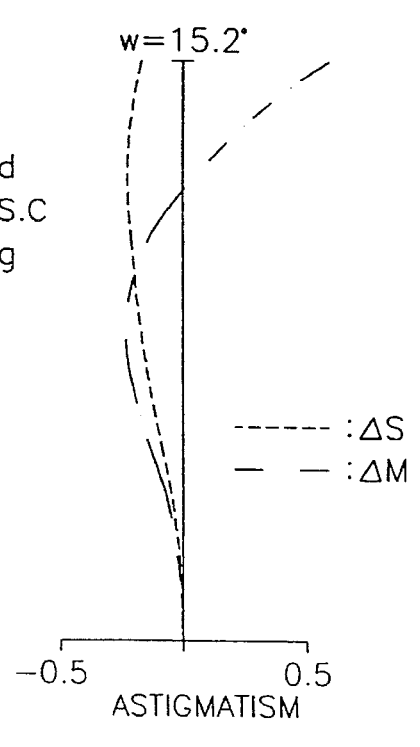
Figure 4F:
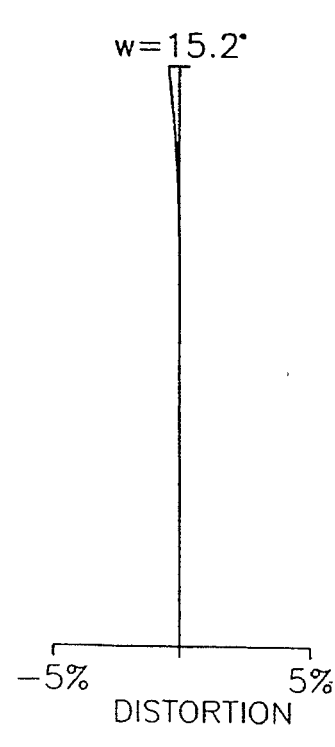

Referring to FIGS. 3A and 3B, the zoom lens system according to the second embodiment of the present invention comprises a first lens group I having a positive refractive power, a second lens group II having a negative refractive power, and an aperture stop "A", the distance between the first lens group I and second lens group II being variable during zooming. By fulfilling the conditions provided for the first embodiment, the aberrations can be compensated for also in the second embodiment as shown in FIGS. 4A–4C and 4D–4F.

A set of exemplary parameter values for the zoom lens system according to the second embodiment is provided in reference to Table 2.

TABLE 2

$F_{NO} = 1:4.0\text{~}7.7$
$f = 40.0\text{~}80.1$
$\omega = 28.5°\text{~}15.2°$
$f_B = 9.88\text{~}47.02$

| Surface Number | r | d | N | $\upsilon$ |
|---|---|---|---|---|
| 1 | 17.629 | 3.50 | 1.58913 | 61.3 |
| 2 | 43.843 | 1.12 | | |
| 3 | −17.701 | 4.88 | 1.72000 | 43.9 |
| 4 | 15.878 | 3.25 | 1.51680 | 64.2 |
| 5 | −15.878 | 1.65 | | |
| 6 | 30.635 | 2.80 | 1.48749 | 70.4 |
| 7 | −30.635 | 11.896 | 3.000 | |
| 8 | −33.431 | 2.18 | 1.59044 | 30.9 |
| 9 | −12.795 | 1.03 | | |
| 10 | −20.755 | 1.00 | 1.52540 | 56.3 |
| 11 | 99.016 | 4.19 | | |
| 12 | −11.909 | 1.80 | 1.74400 | 44.9 |
| 13 | −32.876 | | | |

Conic constant and aspheric surface coefficients of r9
K : −7.671459848299
$A_4$: −0.1462791511543×10$^{-3}$
$A_6$: 0.9413432030988×10$^{-6}$
$A_8$: −0.4427433163654×10$^{-8}$
$A_{10}$: 0

Conic constant and aspheric surface coefficients of r10
K : −25.72289748933
$A_4$: 0.6829553966762×10$^{-5}$
$A_6$: 0.99568660394996×10$^{-6}$
$A_8$: 0.7836132246559×10$^{-7}$
$A_{10}$: 0

The values of the conditions 1 to 12 are as follows:

| | |
|---|---|
| $f_T \cdot f_{bT}/D_T \cdot f_{bW}$: 43.88 | [condition 1] |
| $D_T/N_{nI}$: 1.744 | [condition 2] |
| $N_T$: 1.59618 | [condition 3] |
| $\upsilon_T$: 53.13 | [condition 4] |
| $N_{nI}$: 1.72000 | [condition 5] |
| $N_{apI}$: 1.53114 | [condition 6] |
| $\upsilon_{apI}/N_{apI}$: 42.65 | [condition 7] |
| $\upsilon_{nI}/N_{nI}$: 25.52 | [condition 8] |
| $N_{pII}$: 1.59044 | [condition 9] |
| $N_{aNII}$: 1.63470 | [condition 10] |
| $(\upsilon_{apI}-\upsilon_{NI})/(\upsilon_{aNII}-\upsilon_{PII})$: 1.086 | [condition 11] |
| $|f_{pII}/f_{NII}|$: 1.037 | [condition 12] |

The zoom lens system according to the present invention is advantageous in that plastic materials can be used for the second lens group such that the manufacturing cost is reduced, a good aberration performance is maintained, the location of image point does not change even though the atmospheric temperature changes, and a good optical performance is maintained. Also, the lenses of the first lens group can be constructed to have same radii of curvature which makes the lenses easy to manufacture and assemble and contributes to improved productivity.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A zoom lens system comprising a first lens group having a positive refractive power and a second lens group having a negative refractive power, a distance between the first lens group and the second lens group being variable during zooming, wherein the first lens group includes a first lens having a positive refractive power and a convex surface toward the object side, a second lens having a negative refractive power and being bi-concave, a third lens having a positive refractive power, being bi-convex, and space from or abutting the second lens, and a fourth lens having a positive refractive power, being bi-convex, and space from the third lens, the second lens group includes a fifth lens of plastic material having a positive refractive power and a concave surface toward the object side, a sixth lens of plastic material having a negative refractive power, and a seventh lens having a negative refractive power, wherein $$37 < (f_I * f_{bT}/D_T * f_{bw}) < 48;$$

where $f_I$: focal length of the first lens group $f_{bT}$: back focus distance at a telephoto position $f_{bw}$: back focus distance at a wide angle position $D_T$: distance between the first lens group and the second lens group at a telephoto position, wherein $N_T < 1.65;$ and $V_T > 48$ where $N_T$: average of refractive ratio of the lens system as a whole $V_T$: average of ABBE number of the lens system as a whole, and wherein $0.80 < |f_{pII}/f_{NII}| < 1.20$ where $f_{pII}$: focal length of plastic lenses having positive refractive power in the second lens group $f_{NII}$: focal length of plastic lenses having negative refractive power in the second lens group.

2. A zoom lens system according to claim 1 wherein $N_{PII} < 1.6;$ $N_{anII} < 1.7;$ and $0.7 < (v_{apI} - v_{nI})/(v_{anII} - v_{pII}) < 1.5$ where $N_{pII}$: refractive ratio of a lens having a positive refractive power in the second lens system $N_{anII}$: average of refractive ratios of lenses having negative refractive power in the second lens system $v_{anII}$: average of ABBE numbers of lenses having negative refractive power in the second lens system $v_{pII}$: ABBE number of a lens having a positive refractive power in the second lens system $v_{apI}$: average of ABBE numbers of lenses having positive refractive power in the first lens system $v_{nI}$: ABBE number of a lens having a negative refractive power in the first lens system.

3. A zoom lens system comprising a first lens group having a positive refractive power and a second lens group having a negative refractive power, a distance between the first lens group and the second lens group being variable during zooming, wherein the first lens group includes a first lens having a positive refractive power and a convex surface toward the object side, a second lens having a negative refractive power and being bi-concave, a third lens having a positive refractive power, being bi-convex, and space from or abutting the second lens, and a fourth lens having a positive refractive power, being bi-convex, and space from the third lens, the second lens group includes a fifth lens of plastic material having a positive refractive power and a concave surface toward the object side, a sixth lens of plastic material having a negative refractive power, and a seventh lens having a negative refractive power, wherein $N_{nI} 1.75;$ $N_{apI} < 1.55;$ $38 < v_{apI}/N_{apI} < 45;$ and $20 < v_{NnI} < 30$ where $N_{apI}$: average of refractive ratios of lenses having positive refractive power in the first lens group $N_{nI}$: refractive ratio of a lens having a negative refractive power in the first lens group $V_{apI}$: average of ABBE numbers of lenses having positive refractive power in the first lens group $v_{nI}$: ABBE number of a lens having a negative refractive power in the first lens group, and wherein $0.08 < |f_{pII}/f_{NII}| < 1.20$ where $f_{pII}$: focal length of plastic lenses having positive refractive power in the second lens group $f_{NII}$: focal length of plastic lenses having negative refractive power in the second lens group.

4. A zoom lens system according to claim 3 wherein $N_T < 1.65;$ and $v_T < 48$ where $N_T$: average of refractive ratio of the lens system as a whole $v_T$: average of ABBE number of the lens system as a whole.

5. A zoom lens system according to claim 3 wherein $N_{pII} < 1.6;$ $N_{aNII} < 1.7$;

and $0.7 < (v_{apI} - v_{nI})/(v_{anII} - v_{pII}) < 1.5$ where $N_{pII}$: refractive ratio of a lens having a positive refractive power in the second lens system $N_{anII}$: average of refractive ratios of lenses having negative refractive power in the second lens system $v_{anII}$: average of ABBE numbers of lenses having negative refractive power in the second lens system $v_{pII}$: ABBE number of a lens having a positive refractive power in the second lens system.

\* \* \* \* \*

UNITED STATES PATENT AND TRADEMARK OFFICE
CERTIFICATE OF CORRECTION

PATENT NO. : 5,617,253
DATED : April 01, 1997
INVENTOR(S) : Geon-mo KANG

It is certified that error appears in the above-indentified patent and that said Letters Patent is hereby corrected as shown below:

Title page, item [57], in the Abstract, line 3, delete "a".

Claim 3, column 12, line 25, "$N_{nI} 1.75$" should read --$N_{nI} < 1.75$--.

Claim 3, column 12, line 33, "$20 < V_{NnI} < 30$" should read --$20 <_{nI}/N_{nI} < 30$--.

Claim 4, column 12, line 57, "$V_T < 48$" should read --$V_T > 48$--.

Signed and Sealed this

Twentieth Day of January, 1998

Attest:

BRUCE LEHMAN

*Attesting Officer*   *Commissioner of Patents and Trademarks*